US012688975B2

(12) United States Patent (10) Patent No.: US 12,688,975 B2
Wagner et al. (45) Date of Patent: Jul. 21, 2026

(54) CAPACITOR WITH LAMINATED ROUND-SHAPED BUS BAR

(71) Applicant: TDK Electronics AG, Munich (DE)

(72) Inventors: Tomás Wagner, Málaga (ES);
Fernando Rodríguez, Málaga (ES);
Alvaro Gonzalez, Alhaurin de la Torre (ES); Adrian Arcas, Málaga (ES);
Manuel Gómez, Coín (ES)

(73) Assignee: TDK Electronics AG, Munich (DE)

( * ) Notice: Subject to any disclaimer, the term of this patent is extended or adjusted under 35 U.S.C. 154(b) by 116 days.

(21) Appl. No.: 18/710,483

(22) PCT Filed: Oct. 11, 2022

(86) PCT No.: PCT/EP2022/078208
§ 371 (c)(1),
(2) Date: May 15, 2024

(87) PCT Pub. No.: WO2023/088613
PCT Pub. Date: May 25, 2023

(65) Prior Publication Data
US 2025/0014826 A1     Jan. 9, 2025

(30) Foreign Application Priority Data

Nov. 17, 2021     (EP) ..................................... 21383040

(51) Int. Cl.
*H01G 4/38*     (2006.01)
*H01G 4/228*     (2006.01)
*H01G 4/224*     (2006.01)

(52) U.S. Cl.
CPC ............... *H01G 4/38* (2013.01); *H01G 4/228* (2013.01); *H01G 4/224* (2013.01)

(58) Field of Classification Search
None
See application file for complete search history.

(56) References Cited

U.S. PATENT DOCUMENTS

| | | | |
|---|---|---|---|
| 2009/0141419 A1* | 6/2009 | Pal ........................ | H01G 11/82 |
| | | | 29/25.42 |
| 2009/0154056 A1 | 6/2009 | Delgado et al. | |
| 2010/0132193 A1 | 6/2010 | Yoshinaga | |

FOREIGN PATENT DOCUMENTS

| | | |
|---|---|---|
| CN | 101465207 A | 6/2009 |
| CN | 101682270 A | 3/2010 |
| CN | 203966836 U | 11/2014 |
| CN | 204407189 U | 6/2015 |
| CN | 104766722 B | 7/2015 |
| CN | 104934223 A | 9/2015 |
| CN | 106206016 A | 12/2016 |

(Continued)

OTHER PUBLICATIONS

Decision on Rejection issued in corresponding Chinese Patent Application No. 202111362549.1, dated Dec. 18, 2025, with English Language Translation, 12 pages.

(Continued)

*Primary Examiner* — Eric W Thomas
(74) *Attorney, Agent, or Firm* — MH2 Technology Law Group LLP

(57)     ABSTRACT
A bus bar for a capacitor is described, wherein the bus bar is laminated and wherein the bus bar includes a round shape. Furthermore, a capacitor including the bus bar is described.

19 Claims, 7 Drawing Sheets

(56)                    References Cited

FOREIGN PATENT DOCUMENTS

| | | | |
|---|---|---|---|
| CN | 206282731 | U | 6/2017 |
| CN | 208570361 | U | 3/2019 |
| CN | 209343940 | U | 9/2019 |
| CN | 110600267 | A | 12/2019 |
| CN | 111048304 | A | 4/2020 |
| CN | 113571339 | A | 10/2021 |
| DE | 102018117283 | B3 | 11/2019 |
| JP | 2013251351 | A | 12/2013 |
| JP | 2023161864 | A | 11/2023 |

OTHER PUBLICATIONS

Chinese Office Action dated Apr. 3, 2024, issued in corresponding Chinese Patent Application No. 202111362549.1, with English language translation, 20 pages.
Dessaux, C. (Authorized officer) International Search Report and Written Opinion dated Feb. 15, 2023, PCT Application No. PCT/EP2022/078208, with English language translation, 11 pages.
Chinese Office Action issued in corresponding Chinese Patent Application No. 202111362549.1, dated Oct. 10, 2024, with English language translation, 11 pages.
Kitahara, Notice of Refusal issued in corresponding Japanese Patent Application No. 2024-529437 dated Feb. 12, 2025, with English Language Translation, 8 pages.
Extended European Search Report issued in corresponding European Patent Application No. 26165803.3 dated May 12, 2026, with English Language Translation, 16 pages.

* cited by examiner

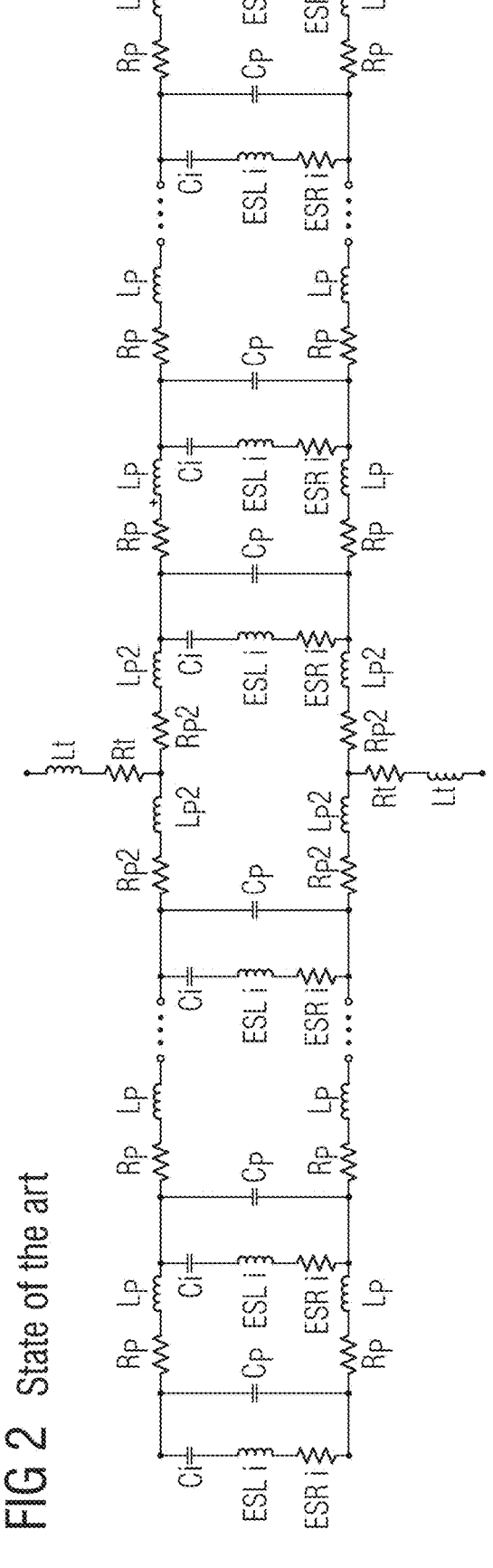
FIG 1   State of the art
FIG 2   State of the art

FIG 3a   State of the art
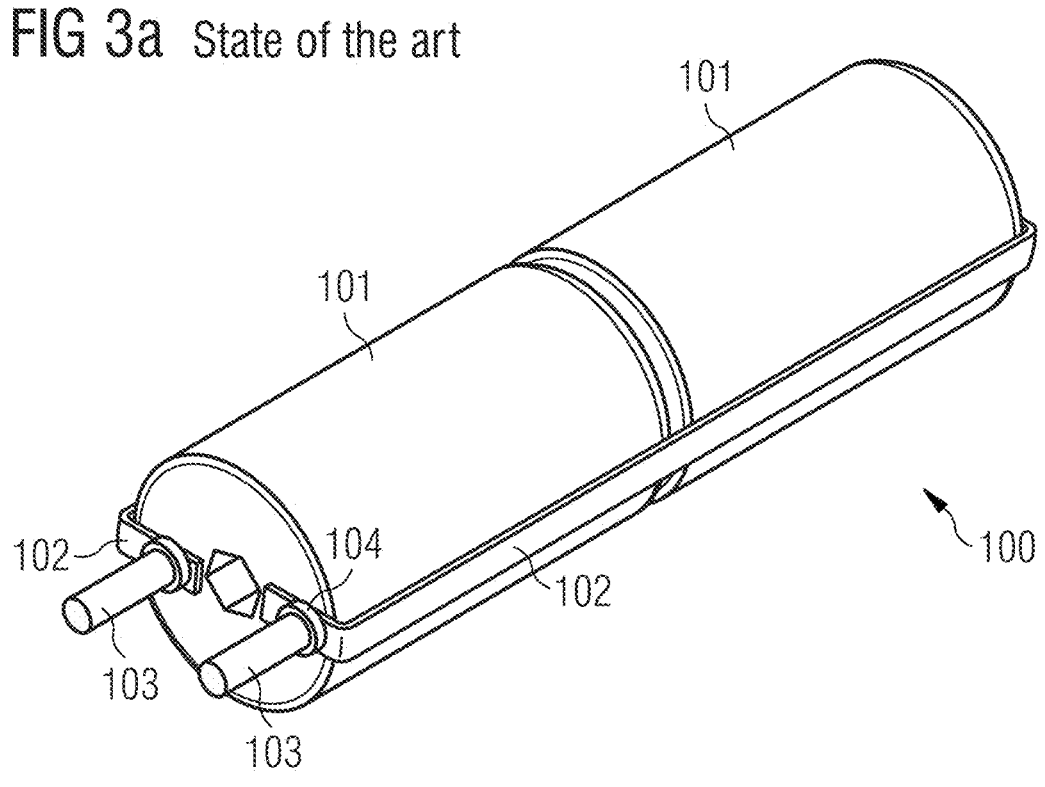
FIG 3b   State of the art
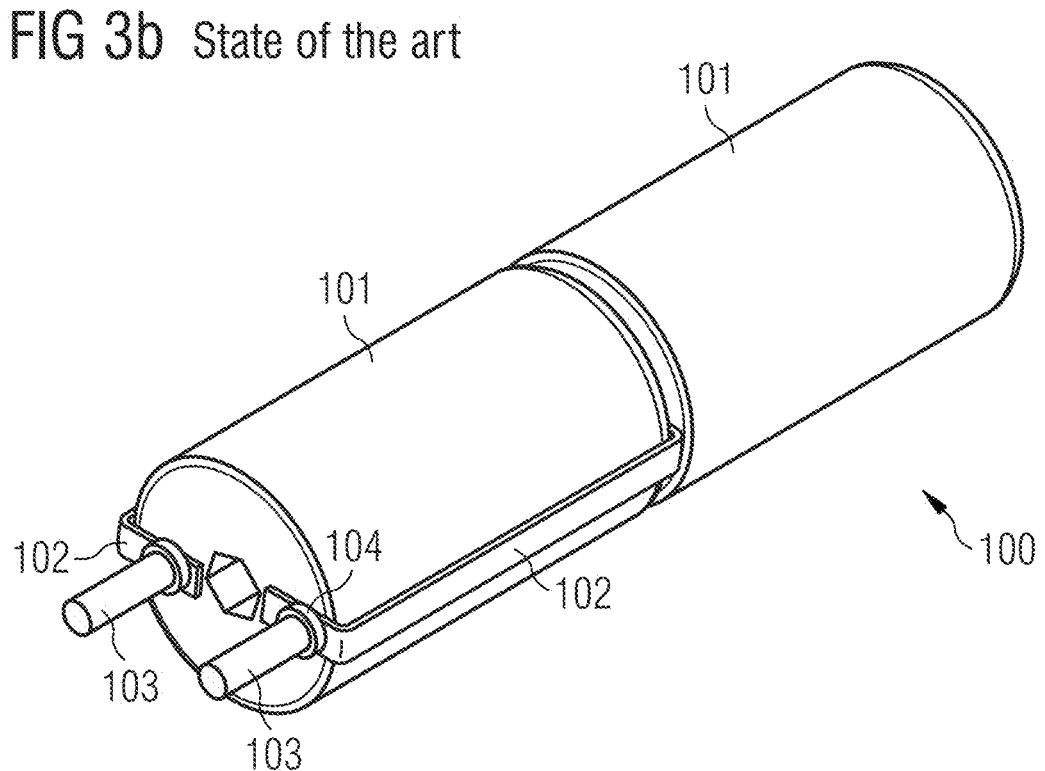

FIG 5a
FIG 5b
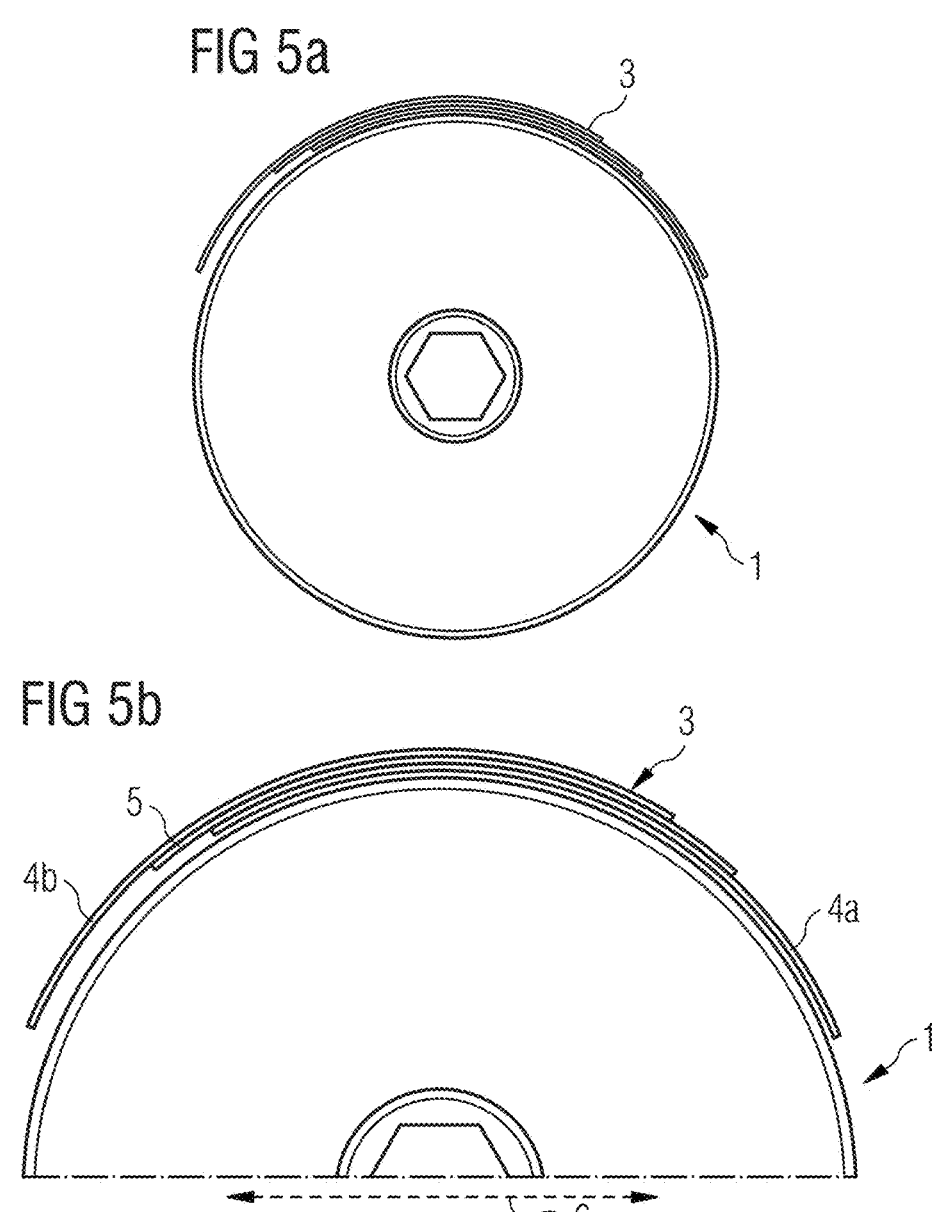
FIG 6
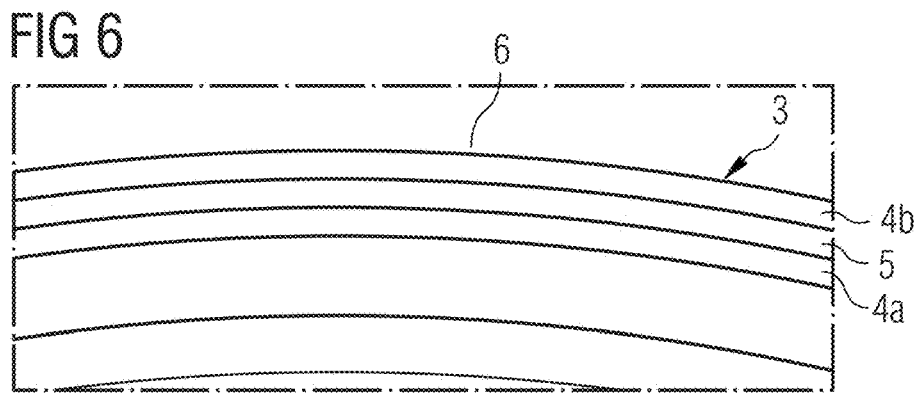

CAPACITOR WITH LAMINATED ROUND-SHAPED BUS BAR

CROSS-REFERENCE TO RELATED APPLICATIONS

The present application is a national stage entry from International Application No. PCT/EP2022/078208, filed on Oct. 11, 2022, published as International Publication No. WO 2023/088613 A1 on May 25, 2023, and claims priority to European Patent Application No. 21383040.9, filed Nov. 17, 2021, the disclosures of all of which are hereby incorporated by reference in their entireties.

FIELD

The present invention relates to a bus bar for a capacitor. Moreover, the present invention relates to a capacitor comprising the bus bar.

BACKGROUND

In high frequency applications, a capacitor has to fulfill the requirements defined in table 1 inside the operation bandwidth.

TABLE 1 requirements for a capacitor in high frequency applications

| | Requirements |
|---|---|
| A | Low Equivalent Series Resistance (ESR) |
| B | Frequency-stable ESR |
| C | Low Equivalent Series Inductance (ESL) |
| D | Homogeneous internal current distribution |
| E | Internal resonance avoidance |

Overlapped bus bars are used for high frequency applications where a low equivalent series inductance (ESL), low and frequency stable equivalent series resistance (ESR) and a homogeneous internal current distribution are needed. The overlapped bus bar contributes as well to the avoiding of internal resonances between elements.

Capacitors with round construction are normally divided internally by windings placed axially connected in parallel. The internal construction (round windings and connection elements) are packed in a round case. The round shape of the capacitor makes the use of an internal overlapped bus bar especially complicated from the mechanical point of view.

Conventionally, the capacitor windings are connected by means of flat bands or wires without any overlapping. This construction has the following disadvantages when good performance at high frequency is requested:

the operation bandwidth is limited to low frequencies (f<10 kHz);

the DC-Link capacitor is divided in several independent capacitors connected in parallel by an external bus bar but if the space is limited and the only dimension of the capacitor that can be increased is the height, the problem cannot be solved with an efficient mechanical solution.

It is an object of the present disclosure to solve the above mentioned problems. This object is solved by the bus bar and the capacitor according to the independent claims.

SUMMARY

According to a first aspect of the present disclosure, a bus bar is provided. The bus bar is configured to be used in a capacitor. The bus bar is adapted to be integrated in a capacitor, in particular a round capacitor. The bus bar is adapted and arranged for high frequency applications. The bus bar is laminated. In other words, the bus bar is at least partly overlapped. The bus bar is designed such that it comprises a larger width/larger extension perpendicular to a longitudinal axis of the capacitor/larger azimuthal extension than conventional bus bars.

The bus bar comprises a round shape. For example, the bus bar comprises the shape of a part of a cylinder shell. The bus bar is adapted to an outer shape of the capacitor into which the bus bar is to be integrated. In particular, the bus bar is adapted to the winding shape of the capacitor.

By means of the laminated bus bar parasitic inductances and resistances (ESRi, Rp, Rp2, ESLi, Lp, Lp2) can be strongly reduced. This makes the bus bar particularly suitable for high frequency applications.

According to one embodiment, the bus bar comprises a first layer or pole. The bus bar further comprises a second layer or pole. The layers may comprise copper, for example. The layers of the bus bar are adapted and arranged to be connected to poles of a capacitor, in particular to poles of winding elements of the capacitor. The bus bar and, in particular, the layers comprises an overlap area. In the overlap area, the layers of the bus bar overlap one another. In this way, a short and very equilibrated electric connection is facilitated.

According to one embodiment, an insulation layer is arranged between the first and second layer. The insulation layer may comprise a polymer, for example. The insulation layer is provided at least in the overlap area. In this way, a short circuit between the two layers of the bus bar can be efficiently avoided.

According to one embodiment, the first layer comprises a plurality of first connection areas. The second layer comprises a plurality of second connection areas. The overlap area of the first layer and the respective first connection area merge into one another. In other words, the first layer and the first connection areas are integrally formed. The overlap area of the second layer and the respective second connection area merge into one another, i.e. the second layer and the second connection areas are integrally formed. Error-prone connections between the overlap area and the connection areas are thus eliminated.

According to a further aspect, a capacitor is provided. The capacitor is adapted for high frequency applications. The capacitor comprises a plurality of winding elements, e.g. two, three, four or more winding elements. The winding elements are axially arranged, i.e. they are arranged along a main longitudinal axis of the capacitor.

The capacitor further comprises at least one bus bar. Preferably, the capacitor comprises exactly one bus bar. In other words, the capacitor comprises a single bus bar. The bus bar may be the previously described bus bar. Thus, all features described in connection with the bus bar apply for the capacitor as well.

The capacitor comprises a round shape. The capacitor may comprise the shape of a cylinder. Accordingly, the respective winding element comprises the shape of a cylinder, as well. The laminated/overlapped bus bar is adapted and arranged to connect the winding elements in parallel. All winding elements are connected to the single overlapped bus bar.

The laminated bus bar provides a shorter and more equilibrated electric connection of the capacitor and, hence, an improvement of the electrical performance of the capacitor as compared to conventional capacitors. Parasitic inductances and resistances can be strongly reduced, independently of the width of the metallized film of the capacitor. Moreover, considering C homogenous, the impedance (Z) from terminals of the capacitor to each independent winding element is homogenous in all the bandwidth.

According to one embodiment, the bus bar is arranged inside a case of the capacitor. Accordingly, the bus bar is an internal bus bar. Preferably, the bus bar is arranged on an outer side of the winding elements. Preferably, the bus bar covers between 20 to 50% of the outer side of the winding elements. The laminated bus bar is very space-saving. In particular, capacitors with the laminated bus bar described above can keep similar dimensions as the one with standard connections (copper bands). Due to the fact that the standard dimensions of the capacitor diameters are kept, a good integration in the power converter is enabled.

According to one embodiment, the bus bar comprises a first layer or pole. The bus bar further comprises a second layer or pole. The first and second layers are electrically insulated from one another. In particular, the layers are electrically insulated by means of the insulation layer described above.

The layers of the bus bar extend at least partly along an outer side of the respective winding element. In other words, the bus bar extends on the outer side of the winding elements along the longitudinal axis.

The bus bar comprises an overlap area. In the overlap area, the layers/poles of the bus bar overlap one another. As the bus bar extends along the longitudinal axis of the capacitor, the bus bar is a laterally overlapped bus bar.

Preferably, the overlap area of the bus bar covers between 5% and 40% of the outer side of the winding elements. In other words, an extension of the bus bar in longitudinal and azimuthal direction is such that the region where the two layers overlap occupies up to 40% of the outer surface of the winding elements. Thereby, the greater the overlap, the better the compensation of parasitic inductances and resistances. The size of the overlap area depends on the size of the capacitor as well as on the number of windings.

According to one embodiment, the bus bar has a shape adapted to a diameter of the respective winding element. In particular, the bus bar comprises a round shape, e.g. the shape of a part of a cylinder shell. The bus bar can be used with any numbers of windings. All windings are connected to the single overlapped bus bar. In other words, a length and/or azimuthal extension of the bus bar can be adapted to the size and number of winding elements. Hence, provision of a very flexibly usable bus bar is provided.

According to one embodiment, the bus bar comprises a plurality of connection areas. In particular, the first layer comprises a plurality of first connection areas. The second layer comprises a plurality of second connection areas. A number of first connection areas corresponds to a number of winding elements. Moreover, a number of second connection areas corresponds to the number of winding elements.

The connection areas are adapted and arranged to be electrically and mechanically connected to poles of the winding elements. The connection areas may be soldered to the poles of the winding elements. Accordingly, the first layer may be connected to a first pole of a respective winding element. The second layer may be connected to a second pole of the respective winding element. In other words, each winding is connected by additional connections (e.g. the connection areas/soldered joints) to the single overlapped bus bar.

In summary, the capacitor comprise a single overlapped bus bar, to which each winding element is connected by additional connections, independent of the amount of winding elements.

Hence, a short and very equilibrated electric connection between the bus bar and the poles is enabled. In this way, the electrical performance of the capacitor is increased. Further features, refinements and expediencies become apparent from the following description of the exemplary embodiments in connection with the figures.

BRIEF DESCRIPTION OF THE DRAWINGS

FIG. 1 schematically shows a simplified electrical model of a capacitance unit according to the state of the art, FIG. 2 schematically shows a simplified electrical model of a DC-Link capacitor according to the state of the art, FIGS. 3a and 3b schematically show a perspective view of a capacitor according to the state of the art, FIGS. 4a and 4b schematically show a perspective view of parts of a capacitor, FIGS. 5a and 5b schematically show a sectional view of a part of a capacitor, FIG. 6 schematically shows a sectional view of a part of a capacitor, FIG. 7 schematically shows a perspective view of a part of a capacitor, FIG. 8 schematically shows a perspective view of the capacitor according to FIG. 7, FIGS. 9a to 9c schematically show a perspective view of parts of the capacitor according to FIGS. 7 and 8, FIG. 10 schematically shows a comparative ESR measurement between a capacitor according to the state of the art and the capacitor according to the present disclosure.

DETAILED DESCRIPTION

Figure 4A:
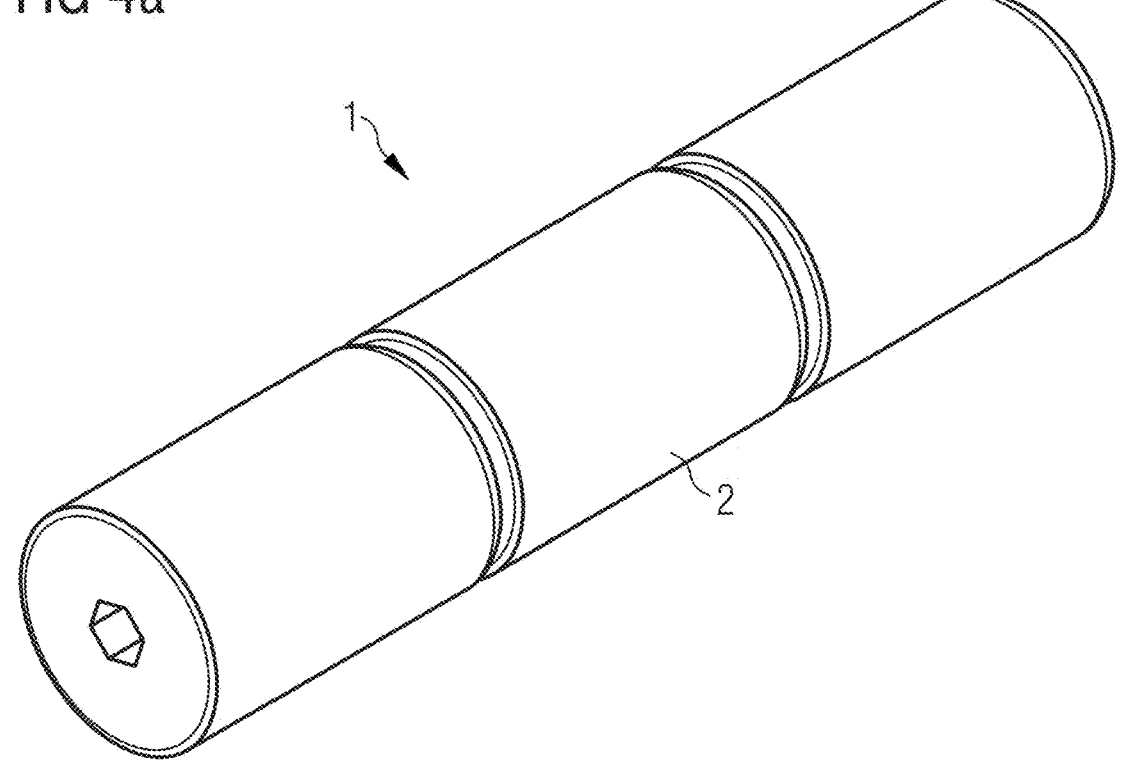

FIGS. 1, 2, 3a and 3b are related to a capacitor according to the state of the art. In particular, FIGS. 3a and 3b show a conventional capacitor 100 from a first side (FIG. 3a) and from the opposite side (FIG. 3b). The capacitor 100 is divided into units Ci (see FIGS. 1 and 2) which are connected in parallel by flat copper bands 102. Each capacitance unit Ci contains a capacitance element (winding element 101) and its connections to the copper band 102.

The winding elements 101 are connected in parallel by the copper bands 102 without any overlap of the copper bands 102. The copper bands 102 electrically connect terminals/poles 103 of the winding elements 101. The respective copper band 102 is secured to the respective terminal 103 by means of a screw 104. The respective copper band 102 extends along an outer side of the capacitor 100 and, in particular, outside a case of the capacitor 100 (external bus bar). In other words, one copper band 102 extends on the first outer side of the capacitor 100 and another copper band 102 extends on the second (opposite) outer side of the capacitor 100.

In this context, FIG. 1 shows a simplified electrical model of the capacitance unit Ci (winding element 101 and its connection to the copper band 102). Thereby, ESRi denotes the parasitic ESR of the capacitance unit Ci and ESLi denotes the parasitic ESL of the capacitance unit Ci.

A simplified electrical model of a complete DC-Link capacitor (with a plurality of capacitance units Ci) is shown in FIG. 2, where Ci: capacitance unit—capacitance value, ESRi: capacitance unit—parasitic ESR, ESLi: capacitance unit—parasitic ESL, Cp: connectors between capacitance units—parasitic capacitance, Rp, Rp2: connectors between capacitance units—parasitic resistance, Lp, Lp2: connectors between capacitance units—parasitic inductance, Rt: terminal—parasitic resistance, Lt: terminal—parasitic inductance.

The electrical requirements achieved with this solution are summarized in table 2.

TABLE 2

| requirements for a capacitor in high frequency applications as achieved by capacitors according to the state of the art. | | |
|---|---|---|
| | Requirements | Achieved by state of the art |
| A | Low Equivalent Series Resistance (ESR) | No |
| B | Frequency-stable ESR | No |
| C | Low Equivalent Series Inductance (ESL) | No |
| D | Homogeneous internal current distribution | No |
| E | Internal resonance avoidance | No |

FIGS. 4 to 9 schematically show a capacitor 1 according to the present invention. The capacitor 1 has a round construction. In other words, the capacitor 1 has a round outer shape. In particular, the capacitor 1 comprises the outer shape of a cylinder (see, in particular, FIGS. 4a, 4b, 8 and 9a to 9c). The capacitor 1 is especially adapted to be used in high frequency applications.

The capacitor 1 comprises a plurality of winding elements 2. In this embodiment, the capacitor 1 comprises three winding elements 2 (FIG. 4a). Of course, the capacitor 1 can comprise more than three winding elements 2, e.g. four, five or six winding elements 2. The capacitor 1 can also comprise less than three winding elements 2, e.g. two winding elements 2. In particular, the number of winding elements 2 is freely selectable. In other words, the construction described in the following can be implemented with any number of winding elements 2. An insulation 9 is arranged between succeeding winding elements 2 as can be seen from FIG. 8. The insulation 9 may comprise a polymer, for example.

Figure 4B:
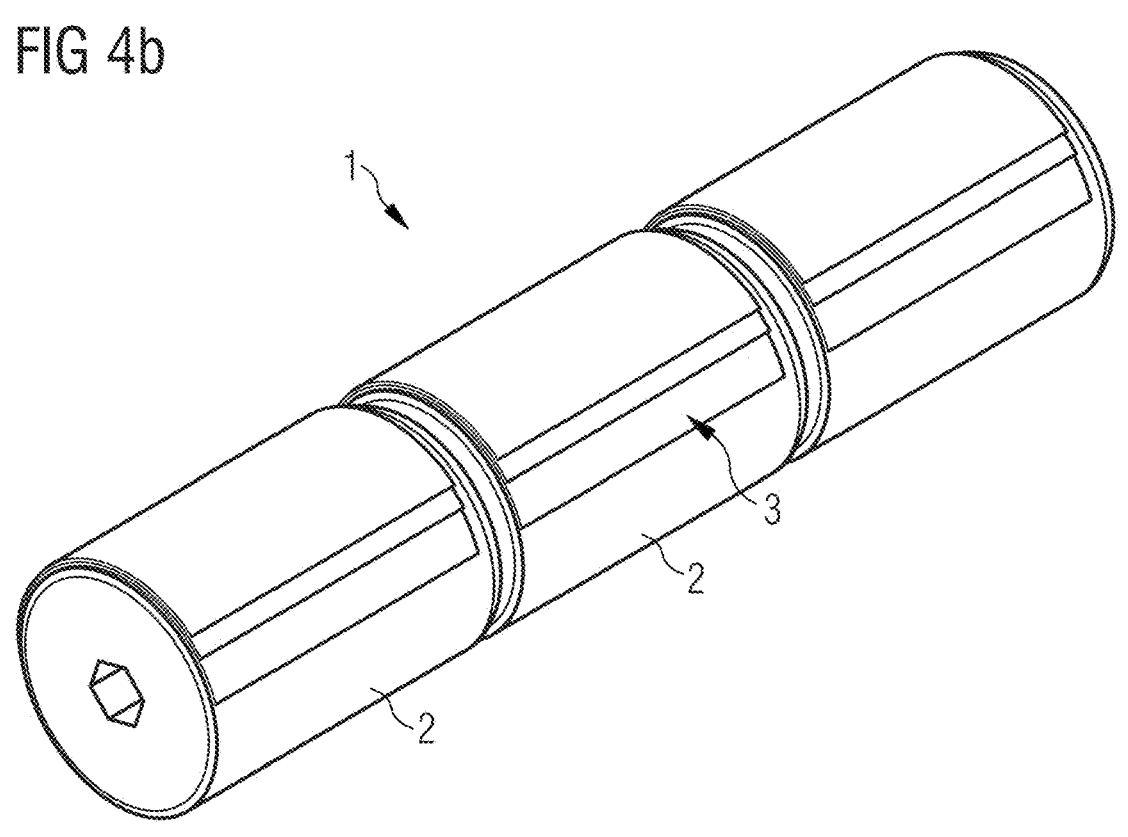

The winding elements 2 are axially arranged, i.e. they are arranged along a main longitudinal axis 18 of the capacitor 1. The winding elements 2 are electrically connected in parallel. For this purpose, a laminated bus bar 3 is provided (FIG. 4b). In particular, one single laminated (i.e. over-lapped) bus bar 3 is provided. In this context, the term "laminated" means that the bus bar 3 comprises several layers (4a, 4b, 5; see, for example, FIG. 6). The said layers, which are explained later on in detail, overlap one another at least partly along an outer side of the winding elements 2. In other words, the bus bar 3 is a (lateral) overlapping (or overlapped) bus bar.

As can be seen from FIG. 4b, the bus bar 3 extends along the outer side of the winding elements 2 (lateral bus bar). The bus bar 3 extends along the outer side of the winding elements 2 from a first end side 10 towards a second end side 11 of the capacitor 1 (see FIG. 8). The bus bar 3 covers the outer side of the respective winding element 2 at least partly. Altogether, the whole bus bar 3 covers between 20% and 50% of the outer side of the winding elements 2. The bus bar 3 is an internal bus bar. In other words, the bus bar 3 is arranged inside a case 16 of the capacitor 1 (see FIG. 9c).

The bus bar 3 has a round shape which can be taken particularly well from FIG. 5a. The bus bar 3 comprises the shape of an (incomplete) cylinder shell. The bus bar 3 has a shape which is adapted to an outer shape and/or a diameter of the respective winding element 2 and the case 16 of the capacitor 1. The bus bar 3 can be used with any number of windings. A length (axial extension, i.e. extension along the main longitudinal axis 18 of the capacitor 1) of the bus bar 3 is adapted to the number of winding elements 2.

The bus bar 3 comprises the previously mentioned layers. In particular, the bus bar 3 comprises a first layer (first pole) 4a and a second layer (second pole) 4b, which can be gathered from FIGS. 5b and 6, for example. The layers 4a, 4b comprise copper. The layers 4a, 4b comprise a thickness between 0.3 mm and 1.5 mm, preferably 0.5 mm.

The layers 4a, 4b overlap at least partly. In particular, in a subarea of the bus bar 3 (overlap area 6), the first layer 4a and the second layer 4b are stacked in a radial direction of the capacitor 1. A size of the overlap area 6 (axial and azimuthal extension) is such that the overlap area 6 covers between 5% and 40% of the outer side of the winding elements 2. Preferably, the overlap area 6 covers 30% of the outer side of the winding elements 2.

The layers 4a, 4b are electrically insulated from one another by means of an insulation layer 5. The insulation layer 5 comprises a polymer. A thickness of the insulation layer 5 is between 0.2 mm and 2.5 mm. Preferably, the thickness of the insulation layer 5 amounts to 0.5 mm.

The insulation layer 5 is arranged between the first layer 4a and the second layer 4a at least in the overlap area 6 of the two layers 4a, 4b. In fact, the insulation layer 5 extends beyond the overlap area 6 in an azimuthal and/or axial direction as can be seen from FIG. 5b, for example. In other words, the azimuthal and/or longitudinal extension of the whole bus bar 3 including the layers 4a, 4b and the insulation layer 5 is larger than the azimuthal extension of the overlap area 6 (see for example FIGS. 7 and 8).

Figure 7:
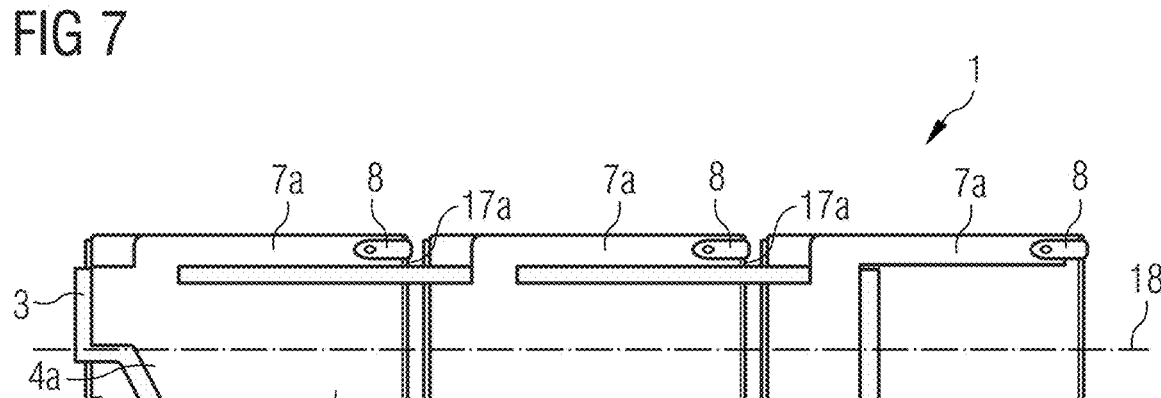

The first layer 4a is connected to a first pole 17a (e.g. the negative pole) of the respective winding element 2 (FIG. 7). The second layer 4b is connected to a second pole 17b (e.g. the positive pole) of the respective winding element 2.

For this purpose, the first layer 4a comprises a plurality of first connection areas 7a. The second layer 4b comprises a plurality of second connection areas 7b. In this embodiment, the respective layer 4a, 4b comprises three respective connection areas 7a, 7b. The number of respective connection areas 7a, 7b corresponds to the number of winding elements 2.

The first connection areas 7a and the first layer 4a are integrally formed. The second connection areas 7b and the second layer 4b are integrally formed. The respective connection area 7a, 7b is bar shaped. The respective connection area 7a, 7b extends parallel to the layers 4a, 4b along the outer surface of the respective winding element 2. In an intermediate section 19a, 19b (see FIGS. 7 and 8), the respective layer 4a, 4b passes over into the respective connection area 7a, 7b. The intermediate section 19a, 19b extends perpendicularly to the connection areas 7a, 7b.

Figure 8:
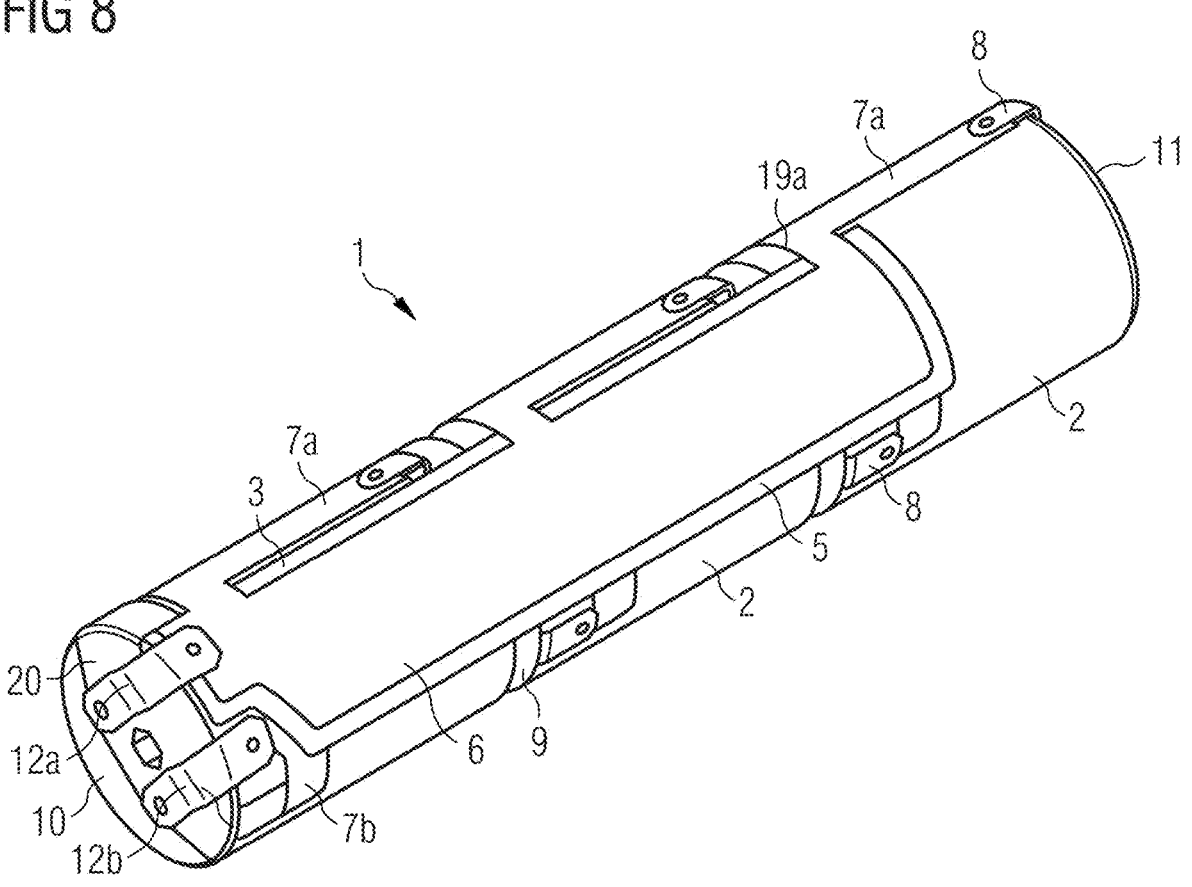

The respective connection area 7a, 7b is electrically and mechanically connected to the respective pole 17a, 17b of a winding element 2 for connecting the winding elements 2 in parallel. The connection areas 7a, 7b are connected to the poles 17a, 17b by means of a connection element 8, e.g. a metal strip (FIGS. 7 and 8). The connection areas 7a, 7b may be soldered to the poles 17a, 17.

Figure 9A:
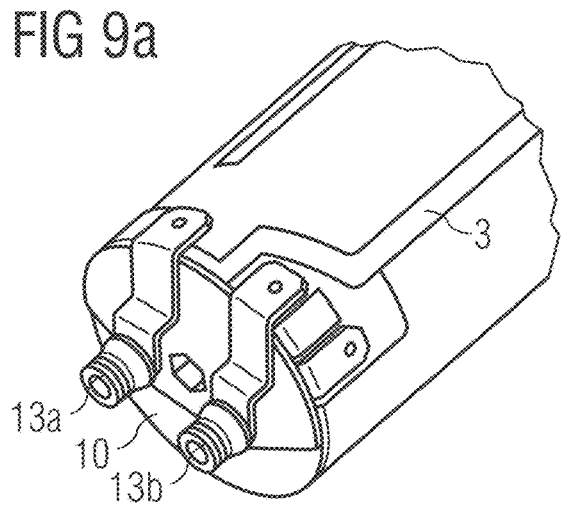

For electrically and mechanically connecting the bus bar 3 to terminals 13a, 13b of the capacitor 1, the capacitor 1 further comprises first and second connecting members 12a, 12b (FIGS. 8 and 9a). The connecting members 12a, 12b are arranged in the first end region 10 of the capacitor 1. The connecting members 12a, 12b comprise metal strips, for example. The connecting members 12a, 12b are bent to connect the bus bar 3 arranged on the side surface of the winding elements 2 with the terminals 13a, 13b which are arranged on the first end side 10 of the capacitor 1. A terminating member 20 is arranged at the first end side 10 between the winding element 2 and the connecting members 12a, 12b (FIG. 8). The terminating member 20 comprises an insulating material, e.g. a polymer.

In a first end section, the first connecting member 12a is connected to the first layer 4a of the bus bar 3, e.g. by means of soldering (FIGS. 8 and 9a). Likewise, in a first end section, the second connecting member 12b is connected to the second layer 4b of the bus bar 3, e.g. by means of soldering (FIGS. 8 and 9a).

In a second or opposite end section, the first connecting member 12a is connected to the first terminal 13a, e.g. by means of a screw or soldering (FIG. 9a). Likewise, in a second or opposite end section, the second connecting member 12b is connected to the second terminal 13b, e.g. by means of a screw or soldering (FIG. 9a).

Figure 9B:
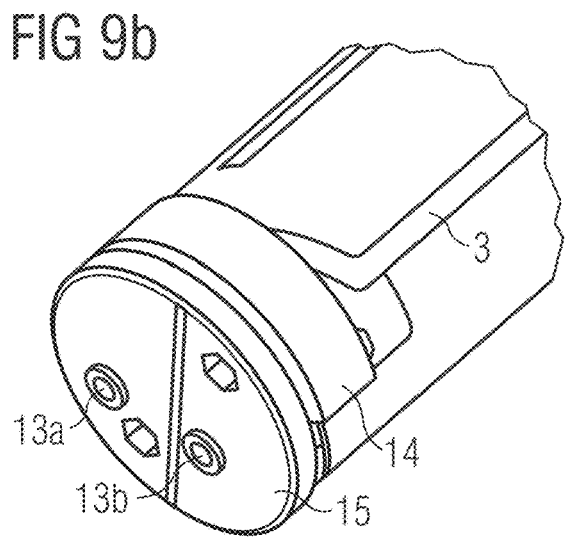

An external insulation 14 is arranged on top of the connecting members 12a, 12b on the side surface of the winding elements 2 (FIG. 9b). The external insulation 14 comprises a strip-like shape. The external insulation 14 comprises a round shape and extends partly around the outer surface of the winding element 2 arranged close to the first end side 10 of the capacitor 1. The external insulation 14 electrically insulates the connecting members 12a, 12b from the case 16 of the capacitor 1 which case 16 is arranged on the external insulation 14 and completely covers the winding elements 2 and the bus bar 3 (FIG. 9c).

Figure 9C:
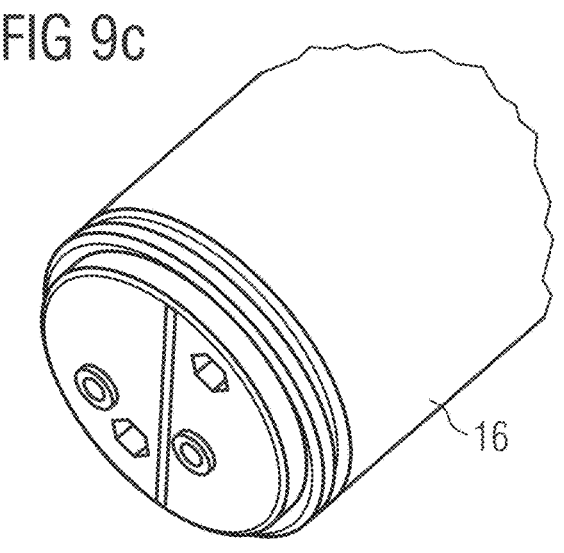

Moreover, on the first end side 10 a cover 15 is arranged on the connecting members 12a, 12b (FIGS. 9b and 9c). The cover 15 comprises two cut-outs. The cut-outs are adapted and arranged to receive the terminals 13a, 13b. The terminals 13a, 13b project from the cut-outs in an axial direction. In this way, an electrical connection of the capacitor 1 is enabled. The cover 15 acts as a terminating element of the first end side 10 of the capacitor 1. A corresponding cover without cut-outs is arranged on the second side face 11 of the capacitor 1 (not explicitly shown).

By means of the construction as described above parasitic inductances and resistances (ESRi, Rp, Rp2, ESLi, Lp, Lp2) can be strongly reduced, independently of the width of the metallized film of the capacitor. Moreover, considering C to be homogenous, the impedance from the terminals 13a, 13b to each independent winding is homogenous in all the bandwidth. Therefore, the requirements summarized in table 3 can be achieved.

TABLE 3 requirements for a capacitor in high frequency applications as achieved by capacitors according to the state of the art in comparison to the capacitor according to the present invention.

| | Requirements | Achieved by state of the art | Achieved by present invention |
|---|---|---|---|
| A | Low Equivalent Series Resistance (ESR) | No | Yes |
| B | Frequency-stable ESR | No | Yes |
| C | Low Equivalent Series Inductance (ESL) | No | Yes |

TABLE 3-continued requirements for a capacitor in high frequency applications as achieved by capacitors according to the state of the art in comparison to the capacitor according to the present invention.

| | Requirements | Achieved by state of the art | Achieved by present invention |
|---|---|---|---|
| D | Homogeneous internal current distribution | No | Yes |
| E | Internal resonance avoidance | No | Yes |

Figure 10:
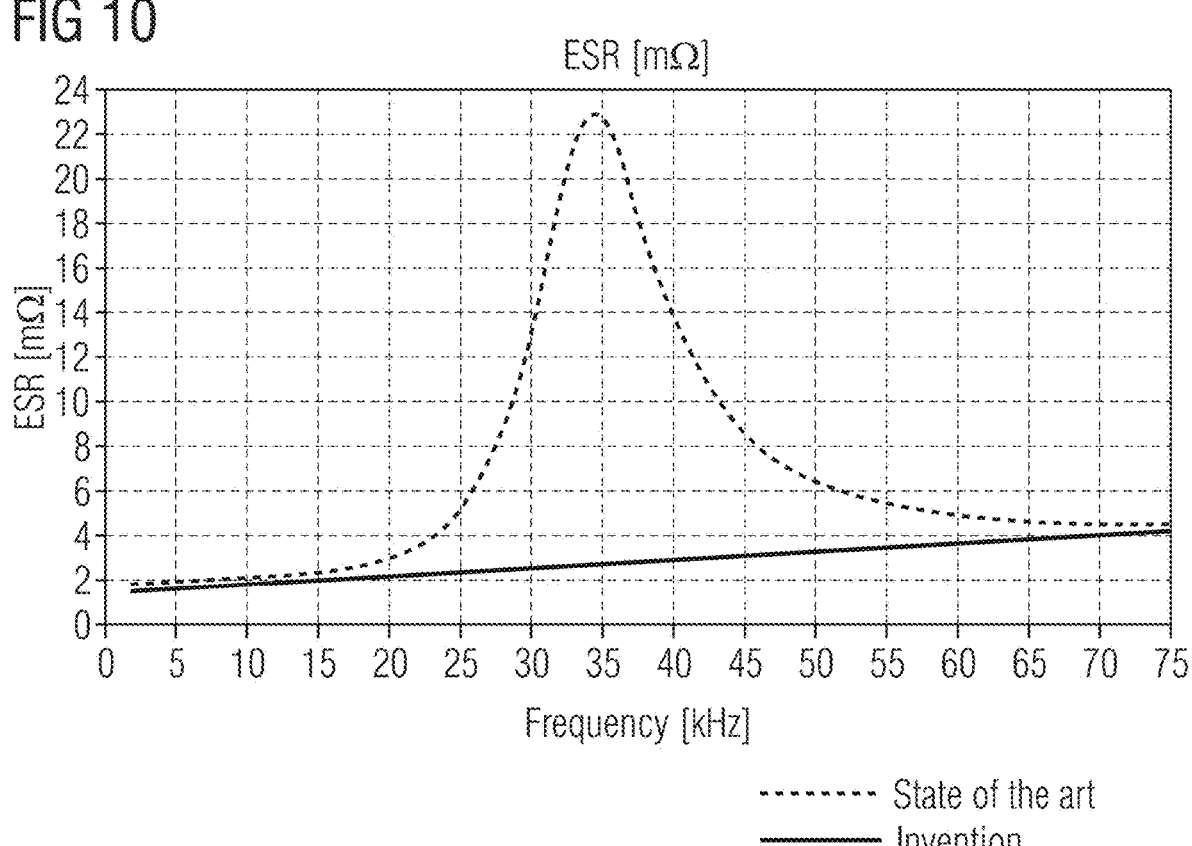

FIG. 10 schematically shows a comparative ESR measurement between the capacitor 100 according to the state of the art (FIGS. 3a, 3b) and the capacitor 1 according to the present disclosure (FIGS. 4 to 9). It can be observed that in the state of the art, the ESR is less frequency-stable than the ESR of the capacitor according to the present invention. This is due to higher skin effect, non-homogenous internal current distribution and internal resonances in the capacitor design based on the state of the art.

In the figures, elements of the same structure and/or functionality may be referenced by the same reference numerals. It is to be understood that the embodiments shown in the figures are illustrative representations and are not necessarily drawn to scale.

The invention claimed is:

1. A capacitor comprising:
a plurality of winding elements; and
one single overlapped bus bar,
wherein the bus bar is laminated and comprises a round shape,
wherein the bus bar is a laterally overlapped bus bar,
wherein the capacitor comprises a round shape,
wherein the bus bar is adapted and arranged to connect the winding elements in parallel, and
wherein all winding elements are connected to the single overlapped bus bar.

2. The capacitor according to claim 1,
wherein the bus bar is arranged inside a case of the capacitor.

3. The capacitor according to claim 1,
wherein the bus bar comprises a first layer and a second layer extending at least partly along an outer side of one of a plurality of winding elements, and
wherein the bus bar comprises an overlap area in which the layers overlap one another.

4. The capacitor according to claim 3,
wherein an insulation layer is arranged between the first and second layer at least in the overlap area.

5. The capacitor according to claim 3,
wherein the first layer comprises a plurality of first connection areas and the second layer comprises a plurality of second connection areas, and
wherein the overlap area of the first layer and the respective first connection area merge into one another, and wherein the overlap area of the second layer and the respective second connection area merge into one another.

6. The capacitor according to claim 4,
wherein the insulation layer comprises a polymer.

7. The capacitor according to claim 3,
wherein the first layer is connected to a first pole of one of the plurality of winding elements, and
wherein the second layer is connected to a second pole of the respective winding element.

8. The capacitor according to claim 1, wherein the bus bar has a shape adapted to a diameter of a respective winding element of the plurality of winding elements.

9. The capacitor according to claim 1, wherein the bus bar comprises a plurality of connection areas adapted and arranged to be electrically and mechanically connected to poles of the winding elements.

10. The capacitor according to claim 9, wherein a respective connection area of the plurality of connection areas is soldered to the pole of the respective winding element of the plurality of winding elements.

11. The capacitor according to claim 9, wherein a number of first connection areas corresponds to a number of winding elements and wherein a number of second connection areas corresponds to the number of winding elements.

12. The capacitor according to claim 9, wherein the connection areas are connected to the poles by means of a connection element.

13. The capacitor according to claim 12, wherein the connection element comprises a metal strip.

14. The capacitor according to claim 1, wherein the bus bar extends along a longitudinal axis of the capacitor.

15. The capacitor according to claim 1, wherein each winding element is connected by additional connections to the single overlapped bus bar independent of an amount of the winding elements.

16. The capacitor according to claim 1, wherein an extension of the bus bar along a main longitudinal axis of the capacitor is adapted to a number of winding elements.

17. The capacitor according to claim 1, wherein the bus bar is adapted and arranged for high frequency applications.

18. The capacitor according to claim 1, wherein the bus bar extends along an outer side of the winding elements from a first end side towards a second end side of the capacitor.

19. A method of using the capacitor according to claim 1, comprising using the capacitor in high frequency applications.

* * * * *